(12) United States Patent
Ogawa

(10) Patent No.: US 6,553,634 B2
(45) Date of Patent: Apr. 29, 2003

(54) CLAMP FOR ELONGATED MEMBER

(75) Inventor: Atsushi Ogawa, Utsunomiya (JP)

(73) Assignee: NIFCO Inc., Yokohama (JP)

( * ) Notice: Subject to any disclaimer, the term of this patent is extended or adjusted under 35 U.S.C. 154(b) by 0 days.

(21) Appl. No.: 09/978,586

(22) Filed: Oct. 18, 2001

(65) Prior Publication Data

US 2002/0046447 A1 Apr. 25, 2002

(30) Foreign Application Priority Data

Oct. 19, 2000 (JP) ........................................ 2000-319262

(51) Int. Cl.[7] .................................................. F16B 2/20
(52) U.S. Cl. ........................................... 24/339; 24/482
(58) Field of Search ................. 24/482, 17 B, 24/336, 339

(56) References Cited

U.S. PATENT DOCUMENTS

| | | | | |
|---|---|---|---|---|
| 350,523 A | * | 10/1886 | Bodley | ............... 211/65 |
| 3,883,929 A | * | 5/1975 | Fortsch | ............... 24/132 R |
| RE29,037 E | * | 11/1976 | Caveney et al. | ...... 269/131 |
| 4,029,277 A | * | 6/1977 | Bulanda | .............. 248/74.1 |
| 4,688,961 A | | 8/1987 | Shioda et al. | |
| 5,277,387 A | * | 1/1994 | Lewis et al. | .......... 248/74.2 |
| 5,407,164 A | * | 4/1995 | Quinn | ................ 248/316.7 |
| 5,535,765 A | * | 7/1996 | Takashima | ........... 132/273 |
| 5,829,726 A | * | 11/1998 | Withun | .............. 248/311.2 |

FOREIGN PATENT DOCUMENTS

| | | | | |
|---|---|---|---|---|
| DE | 29920536 U1 | * | 1/2000 | ...... F16L/23/024 |
| JP | 10-246209 | | 9/1998 | |

* cited by examiner

*Primary Examiner*—James R. Brittain
(74) *Attorney, Agent, or Firm*—Kanesaka & Takeuchi

(57) ABSTRACT

A clamp includes a holding section for receiving an elongated member, a mounting section to be attached to a mounting object, and an elastic ring elastically deformed by the elongated member. The elastic ring is disposed between upper engagement portions formed at both sides of the holding section through lower engagement portions formed at positions closer to a bottom portion of the holding recess section. The ring constituting portions inside the holding recess section are bent in advance toward the bottom portion of the holding recess section. When the elongated member is inserted into the holding section, the ring constituting portions situated inside the holding section closely contact the peripheral surface of the elongated member.

5 Claims, 8 Drawing Sheets

CLAMP FOR ELONGATED MEMBER

BACKGROUND OF THE INVENTION AND RELATED ART STATEMENT

The present invention relates to an improvement of a clamp which holds an elongated member, such as wire, pipe and rod member, such that the elongated member is disposed at a desired position.

Japanese Patent Publication (KOKAI) No. 10-246209 discloses a clamp, which comprises a holding recess section that receives an elongated member, such as wire, pipe and rod member, from a side of the elongated member and elastically holds the elongated member; and a ring made of rubber, which is formed of a pair of ring constituting portions provided at an entrance of fitting the elongated member in the holding recess section such that a pair of ring constituting portions extends between rim portions of the entrance for fitting the elongated member.

In the aforementioned conventional clamp, as the elongated member is fitted into the holding recess section through the entrance for fitting, a pair of ring constituting portions of the rubber ring extending between the rim portions of the entrance is elastically deformed by the elongated member to be situated along an inner surface of the holding recess section, and also, a pair of ring constituting portions elastically deformed as described above closely contacts a peripheral surface of the elongated member, to thereby hold the elongated member in the holding recess section.

According to the conventional clamp, there can be provided the clamp which has the same kind of function and is manufactured at a lower cost as compared with a clamp in which an elastic holding portion closely contacting the peripheral surface of the elongated member fitted into the holding recess section is formed in the holding recess section by so called two-material molding method. However, as the elongated member is fitted into the holding recess section, it is necessary to elastically deform a pair of ring constituting portions extending between the rim portions of the entrance until the pair of the ring constituting portions is situated along the inner surface of the holding recess section. Thus, in fitting the elongated member, resistance thereto occurs.

Accordingly, an object of the invention is to provide a clamp, in which resistance accompanied by the operation of fitting the elongated member into the holding recess section is decreased as little as possible.

Further objects and advantages of the invention will be apparent from the following description of the invention.

SUMMARY OF THE INVENTION

To attain the above object, according to a first aspect of the present invention, there is provided a clamp comprising a holding recess section or holding section, which receives an elongated member, such as wire, pipe and rod member, from a side of the elongated member and elastically holds the elongated member therein; a mounting section to be attached to an object to which the elongated member is mounted; and a rubber-like elastic ring elastically deformed by the elongated member fitted from a fitting entrance of the holding section to be situated along the inner surface of the recess section such that a pair of ring constituting portions located inside the holding recess section closely contacts a peripheral surface of the elongated member. In the clamp as stated above, the rubber-like elastic ring extends between upper engagement portions formed at both sides of the holding recess section, between which the fitting entrance is interposed, through lower engagement portions formed at positions closer to a bottom portion of the holding recess section than the upper engagement portions. The ring constituent portions are bent in advance toward the bottom portion of the holding recess section.

According to the structure stated above, the elongated member can be held in the holding recess section in the condition that the ring constituent portions of the rubber-like elastic ring closely contact the peripheral surface of the elongated member fitted in the holding recess section. As a result, firstly, the elongated member can be prevented from disengaging from the fitting entrance. Also, secondly, the elongated member held in the holding recess section can be prevented from moving toward the longitudinal direction of the elongated member. Thirdly, a vibration which acts on the elongated member held in the holding recess section is absorbed by the rubber-like elastic ring, so as not to generate noises due to the vibration as little as possible. Further, fourthly, the elongated member held in the holding recess section can be held by the rubber-like elastic ring such that the elongated member is prevented from moving, and also, the elongated member can be held by the rubber-like elastic ring in the state that the ring constituting portions of the rubber-like elastic ring mostly contact the surface of the elongated member in the holding recess section.

Thus, even if a rustproof film, such as plating, is applied to the peripheral surface of the elongated member, the rubber-like elastic ring can hold the elongated member in the state that the film is prevented from being peeled off with the passage of time.

Also, as compared with the case in which the rubber-like elastic ring is extended straight between both rim portions of the fitting entrance of the holding recess section, in the clamp of the invention, the resistance of the rubber-like elastic ring accompanied by fitting the elongated member into the holding recess section through the fitting entrance is smaller, so that the operation of fitting the elongated member into the holding recess section can be carried out smoothly.

Further, according to a second aspect of the invention, in the clamp according to the first aspect of the invention, the lower engagement portions are formed at the bottom portion of the holding recess section.

According to the structure of the clamp of the second aspect, the ring constituting portions of the rubber elastic ring, which are situated in the holding recess section, can be bent in advance most largely toward the bottom portion side of the holding recess section, so that the resistance of the ring constituting portions upon fitting the elongated member into the holding recess section can be effectively reduced.

Further, according to a third aspect of the invention, in the clamp according to the first aspect of the invention, an inside of the holding recess section is provided with a raised portion to be surrounded between a pair of the ring constituent portions of the rubber-like elastic ring, which are elastically deformed along the recess section inner surface of the holding recess section by the elongated member fitted from the fitting entrance of the holding recess section, to thereby closely contact the peripheral surface of the elongated member.

According to the structure of the clamp of the third aspect, even if a force for moving the elongated member in the longitudinal direction of the elongated member is applied to the elongated member fitted and held in the holding recess section, the applied force allows one of the ring constituting portions of the rubber-like elastic ring to abut against the raised portion to resist against the force. Accordingly, the movement of the elongated member due to the application of the force described above can be prevented significantly.

DETAILED DESCRIPTION OF PREFERRED EMBODIMENTS

Hereunder, typical embodiments of the invention will be explained with reference to FIG. 1 to FIG. 12.

Figure 1:
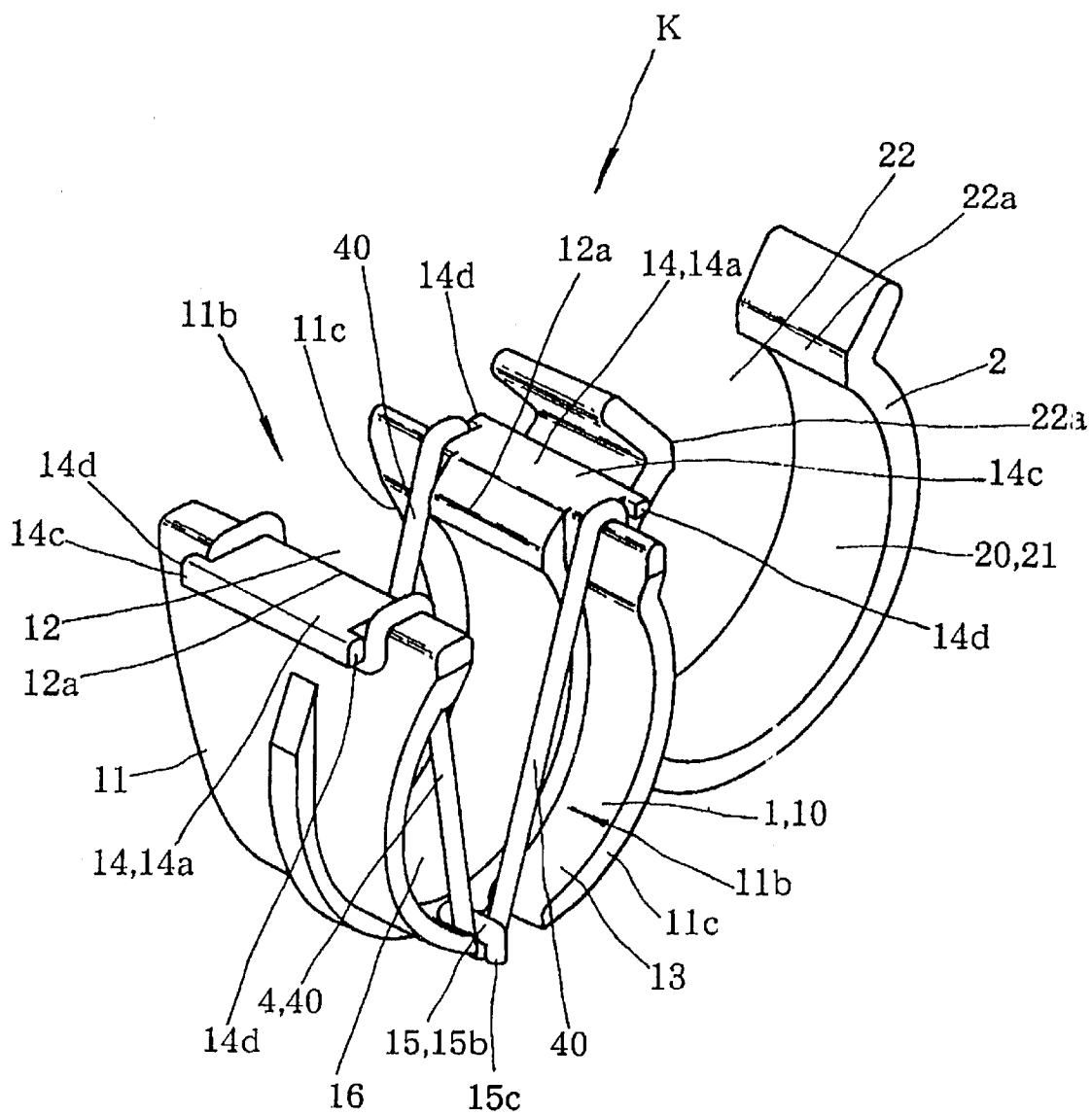
FIG. 1 is a perspective view of a clamp of an embodiment of the invention.
Figure 2:
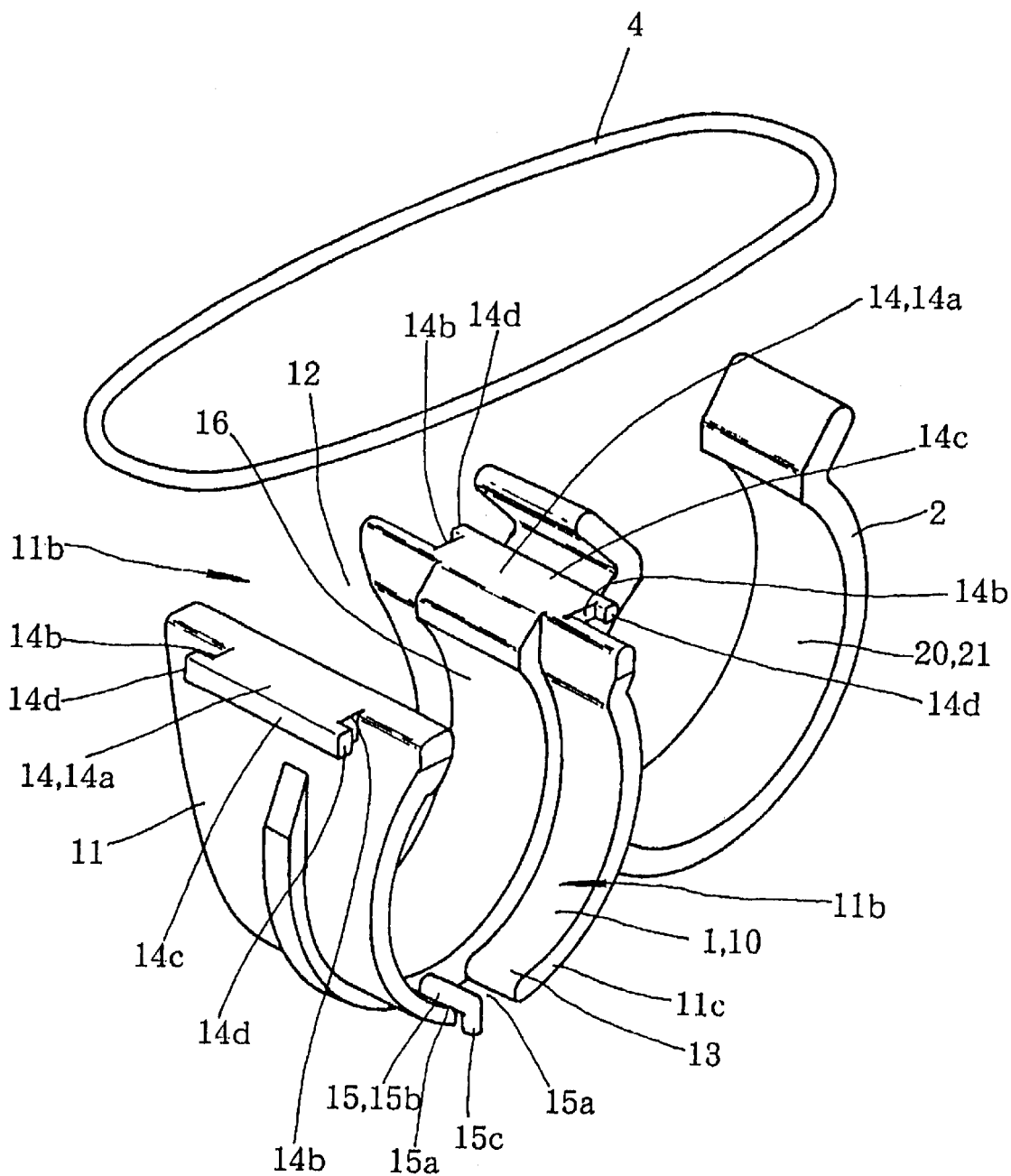
FIG. 2 is an exploded perspective view thereof.
Figure 3:
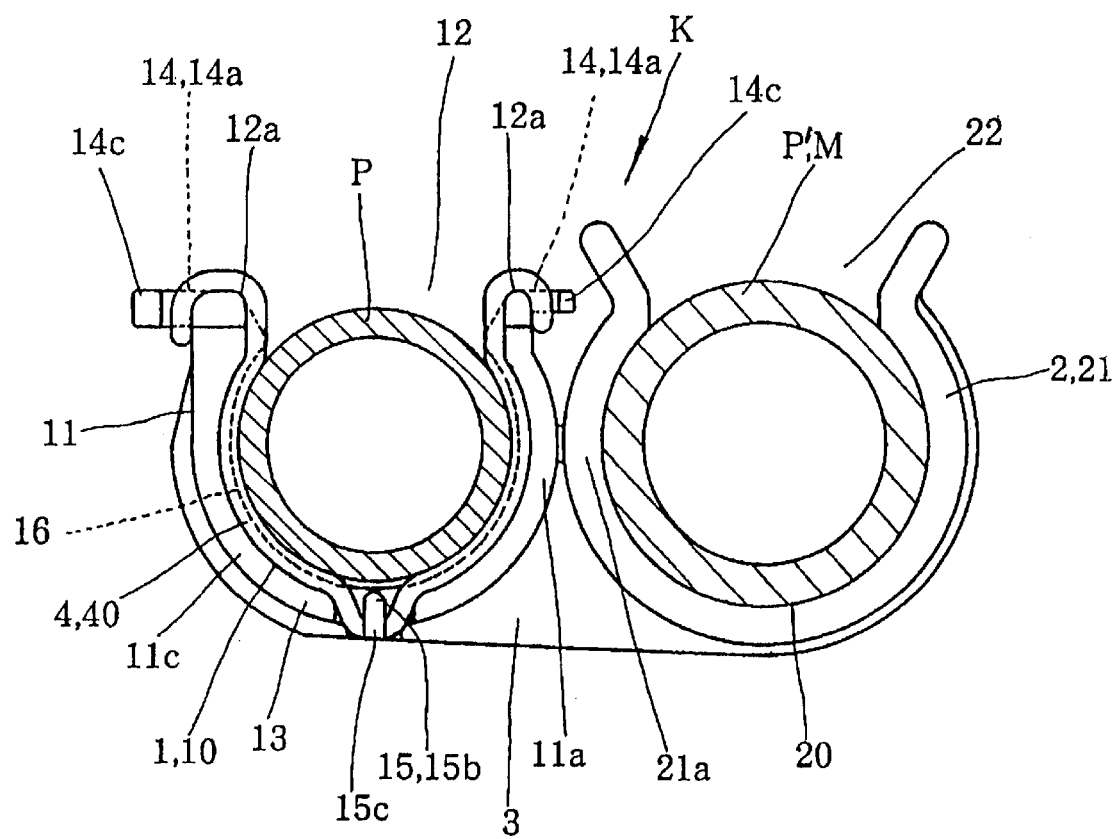
FIG. 3 is a partly sectional view showing the clamp in use.
Figure 11:
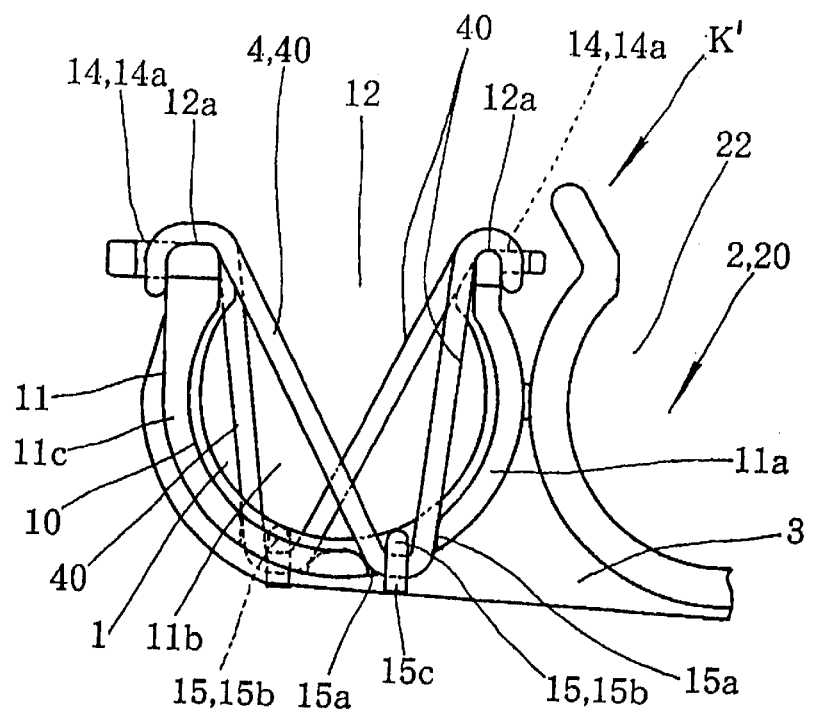
FIG. 11 is a front view showing a main part of a clamp in which a part of the structures is different from that of the clamp shown in FIGS. 1 to 10.
Figure 12:
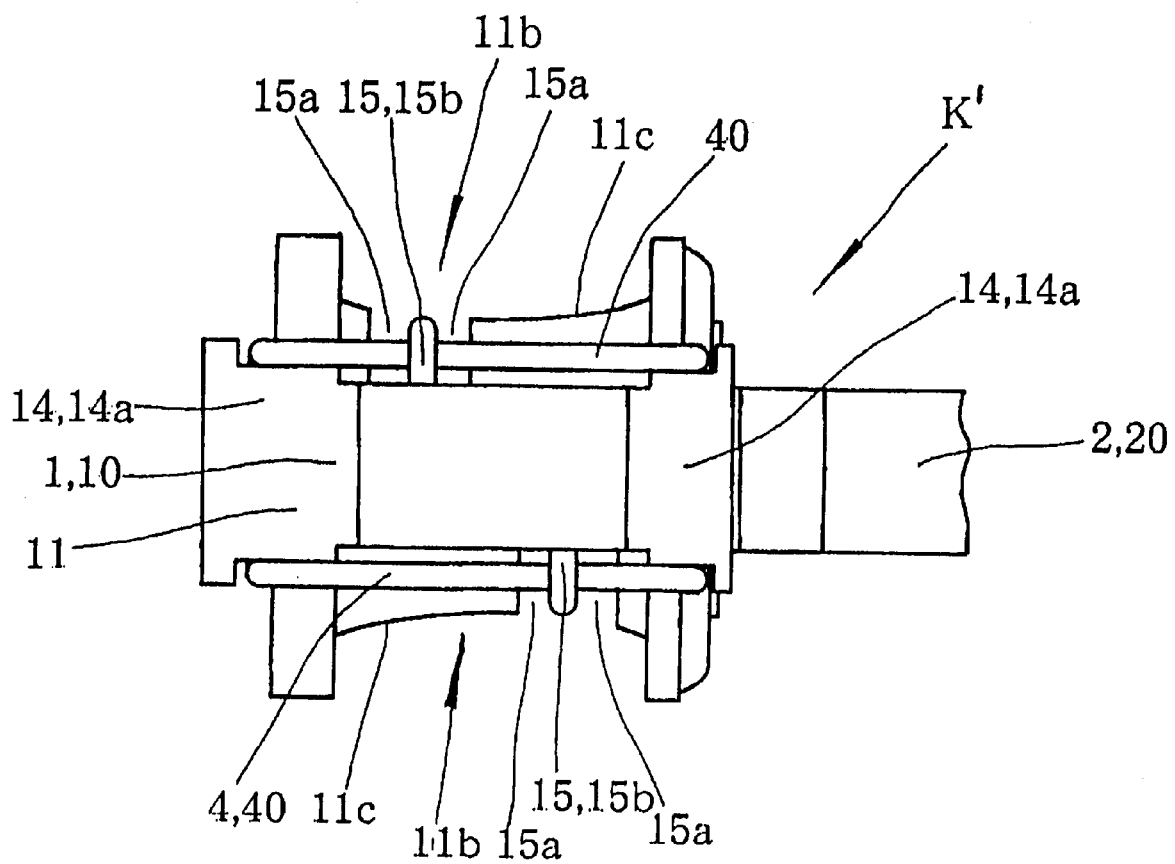
FIG. 12 is a top plan view of the main part of the clamp shown in FIG. 11.

Here, FIG. 1 shows a perspective view of a clamp K according to an embodiment of the invention, and FIG. 2 shows a perspective view showing a state in which a rubber-like elastic ring 4 forming a part of the clamp K is removed. Also, FIG. 3 shows a state in which elongated members P, P' are held by the clamp K, seen from a side. Further, FIG. 4 to FIG. 10 show the clamp K, respectively seen from different directions, or shown in cross sectional views. FIG. 11 and FIG. 12 show a clamp K' in which a part of structures is different from that of the clamp K shown in FIG. 1 to FIG. 10.

The clamp K according to the embodiment of the invention holds an elongated member P, such as wire, pipe and rod member, so as to locate the elongated member at a desired position.

Typically, the clamp K is used such that the pipe or wire forming a fuel system, electric system or the like of an automobile is attached by the clamp K to be connected to a panel forming an automobile, or an elongated member P' is provided adjacent to the elongated member P by the clamp K, to thereby locate the elongated member P at the desired position in the automobile.

Namely, the clamp K includes a holding recess section or holding section 1, which receives the elongated member P from a side of the elongated member to elastically accommodate the received elongated member P, and a mounting section 2 to be attached to a mounting object M to which the elongated member P is attached. Namely, the mounting object M may be a panel of the automobile, the elongated member P' disposed adjacent to the elongated member P held by the clamp K, or the like.

In case the mounting object M is the panel, for example, the mounting section 2 may be formed of a leg member to be fitted into a mounting hole formed in the panel, or may be formed of a mounting plate including an insertion hole for a screw to be fixed to the panel. Also, in case the mounting object M is the elongated member P', the mounting section 2 may be formed of a clamp member which receives the elongated member P' from a side thereof to accommodate the elongated member P', or may be formed of a band or cord member which is wound around the elongated member P'.

In the embodiment of the invention, one holding recess section 1 and one mounting section 2 are provided to form the clamp K. However, unlike this embodiment, a plurality of holding recess sections 1 may be provided, and in this case, a plurality of elongated members P may be held by the holding recess sections 1 at the same time to be mounted as described above.

Firstly, in the embodiment of the invention, in order to suitably hold the elongated member P having a circular outer peripheral shape, the holding recess section or holding section 1 has a recess with a recess section inner surface 10, which is formed along a circular arc of a virtual circle similar to the outer peripheral shape of the elongated member P as shown in FIG. 3.

More specifically, the holding recess section 1 is structured such that a part of an annular member 11 having an inner surface formed along the circular arc of the virtual circle is removed. The inner surface of the annular member 11 constitutes the recess section inner surface 10, and a portion in which a part of the annular member 11 is removed as described above constitutes a fitting entrance 12 for fitting the elongated member P into the holding recess section 1.

The fitting entrance 12 is formed such that an interval y between both rim portions 12a of the fitting entrance 12, which is located in a direction orthogonal to a longitudinal direction of the elongated member P held in the holding recess section 1, is smaller than a diameter of the virtual circle described above.

Accordingly, in this embodiment, as the elongated member P is inserted laterally from the fitting entrance 12 into the holding recess section 1, the annular member 11 is elastically enlarged once to a position in which the interval y between the rim portions 12a of the fitting entrance 12 becomes substantially equal to the diameter of the elongated member P. Thereafter, at a position where the elongated member P is fully inserted into the holding recess section 1, the annular member 11 is elastically restored, and the elongated member P can be held at the holding recess section 1 such that the elongated member P is prevented from disengaging from the fitting entrance 12.

Also, in this embodiment, the mounting section 2 has a structure of holding the elongated member P' as in the holding recess section 1. Namely, in the embodiment of the invention, the mounting section 2 is formed as a recess portion 20 having an inner surface formed along a circular arc of a virtual circle similar to an outer peripheral shape of the elongated member P'.

More specifically, the recess portion 20 forming the mounting section 2 is structured such that a part of an annular member 21 having an inner surface formed along the circular arc of the virtual arc described above is removed, and a portion in which the part of the annular member 21 is removed as described above constitutes a fitting entrance 22 for fitting the elongated member P' into the recess portion 20.

Also, the fitting entrance 22 in the recess portion 20 forming the mounting section 2 is structured such that an interval y' between both rim portions 22a of the fitting entrance 20, which is located in a direction orthogonal to a longitudinal direction of the elongated member P' to be held in the recess portion 20, is smaller than the diameter of the virtual circle described above.

Accordingly, in the embodiment, as the elongated member P' is inserted laterally from the fitting entrance 22 into the recess portion 20, the annular member 21 is elastically enlarged once to a position where the interval y' between the rim portions 22a of the fitting entrance 22 becomes substantially the same as the diameter of the elongated member P'. Thereafter, at a position where the elongated member P' is fully inserted in the recess portion 20, the annular member 21 is elastically restored, and the elongated member P' can be held by the recess portion 20 such that the elongated member P' is prevented from disengaging from the fitting entrance 22.

Also, in this embodiment, the fitting entrance 12 in the holding recess section 1 and the fitting entrance 22 in the recess portion 20 forming the mounting section 2 are directed to the same side, and the annular member 11 forming the holding recess section 1 and the annular member 21 forming the mounting section 2 are integrally connected to each other such that the elongated member P held in the holding recess section 1 and the elongated member P' held in the mounting section 2 are arranged substantially in parallel.

More specifically, a side portion 11a, in one of sides having the fitting entrance 12 therebetween, of the annular member 11 forming the holding recess section 1 is disposed adjacent to a side portion 21a, in one of sides having the fitting entrance 22 therebetween, of the annular member 21 forming the mounting section 2, and the annular members 11 and 21 are integrally connected to each other.

Incidentally, in this embodiment, the connection between the annular members 11 and 21 is made by a connecting plate portion 3 extending between the side portions 11a and 21a, which face each other, of the annular members 11 and 21 at a side opposite to a side of the fitting entrances 12 and 22 in the annular members 11 and 21.

Also, desired elastic deformation characteristics can be provided to the annular members 11 and 21 typically by that the annular members 11 and 21 to be connected by the connecting plate portion 3 are formed of plastic molding by an injection molding or the like.

Further, in this embodiment, the holding recess section 1 is provided with a rubber-like elastic ring 4, which is elastically deformed along the recess section inner surface 10 of the holding recess section 1 by the elongated member P inserted from the fitting entrance 12 such that a pair of the ring constituting portions 40 located in the holding recess section 1 closely contacts a peripheral surface of the elongated member P.

Accordingly, in this embodiment, the elongated member P can be held in the holding recess section 1 in the condition that the ring constituting portions 40 of the rubber-like elastic ring 4 closely contacts the peripheral surface of the elongated member P fitted into the holding recess section 1. As a result, firstly, the elongated member P is prevented from disengaging from the fitting entrance 12. Also, secondly, the elongated member P held in the holding recess section 1 is prevented from moving in the longitudinal direction of the elongated member P. Thirdly, a vibration which acts on the elongated member P held in the holding recess section 1 is absorbed by the rubber-like elastic ring 4, so as not to generate noises due to the vibration as little as possible.

Further, fourthly, the elongated member P held in the holding recess section 1 described above can be held by the rubber-like elastic ring 4 such that the elongated member P is prevented from moving, and at the same time, the elongated member P can be held by the rubber-like elastic ring 4 in the state that the ring constituting portions 40 of the rubber-like elastic ring 4 mostly contacts the surface of the elongated member P in the holding recess section 1. Thus, even if a rustproof film, such as plating, is applied to the peripheral surface of the elongated member P, the rubber-like elastic ring 4 can hold the elongated member P in the state that the film is prevented from peeling off with the passage of time.

As the rubber-like elastic ring 4, there can be used a ring made of rubber, or a ring made of plastics having a rubber-like elasticity. Also, in the embodiment, the rubber-like elastic ring 4 is stretched between upper engagement portions 14 formed respectively at both sides with the fitting entrance 12 therebetween through lower engagement portions 15 formed at positions closer to a bottom portion 13 of the holding recess section 1 than the upper engagement portions 14, such that a pair of ring constituting portions 40 located inside the holding recess section 1 is respectively bent in advance toward a side of the bottom portion 13 of the holding recess section 1.

As a result, in this embodiment, as compared with a case in which the rubber-like elastic ring 4 is extended straight between the rim portions 12a of the fitting entrance 12 of the holding recess section 1, the resistance of the rubber-like elastic ring 4 accompanied by the operation of fitting the elongated member P into the holding recess section through the fitting entrance 12 is smaller, so that the operation of fitting the elongated member P into the holding recess section 1 can be carried out smoothly.

More specifically, in this embodiment, the upper engagement portions 14 formed at both sides and having the fitting entrance 12 therebetween are respectively formed as projecting pieces 14a projecting outwardly from end portions outside the annular ring 11 at the fitting entrance 12 side of the annular ring 11.

The projecting pieces 14a are formed to extend along the longitudinal direction of the elongated member P held in the holding recess section 1. Also, in the projecting pieces 14a, end portions 14b which are directed toward end surfaces 11c of the annular member 11 surrounding opening portions 11b located in a direction orthogonal to the longitudinal direction of the elongated member P, are formed to have a length which allows the end portions 14b to be located at inner sides with respect to the end surfaces 11c.

Also, in this embodiment, the lower engagement portions 15 are disposed at the deepest positions of the holding recess section 1 in the bottom portion 13 of the holding recess section 1, in which the position is located on a center line x passing through a center of the virtual circle and an intermediate position between the rim portions 12a of the fitting entrance 12.

The lower engagement portions 15 are respectively formed at the opening portions 11b of the annular member 11. More specifically, in the embodiment, each lower engagement portion 15 is formed of a projecting portion 15b, which is formed between two split grooves 15a opened to the outside in each end surface 11c of the opening portion 11b, and each projecting portion 15b projects from a side of the split groove 15a to the side of the end surface 11c in the direction along the longitudinal direction of the elongated member P.

Figure 4:
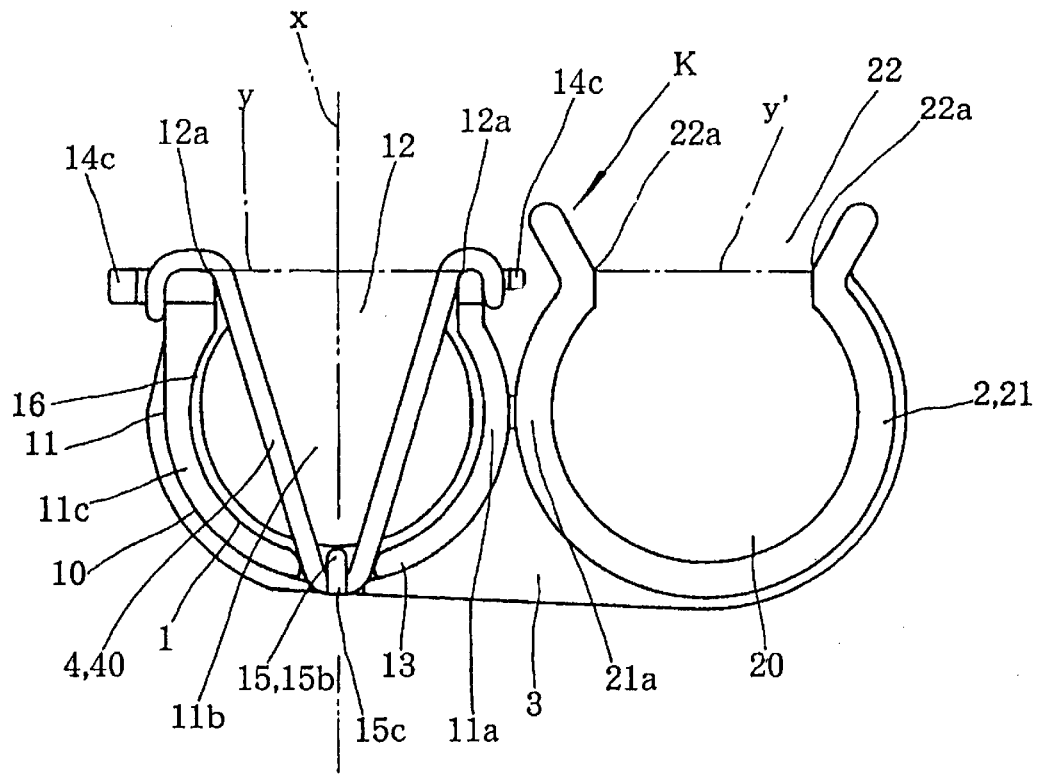
FIG. 4 is a front view of the clamp.
Figure 5:
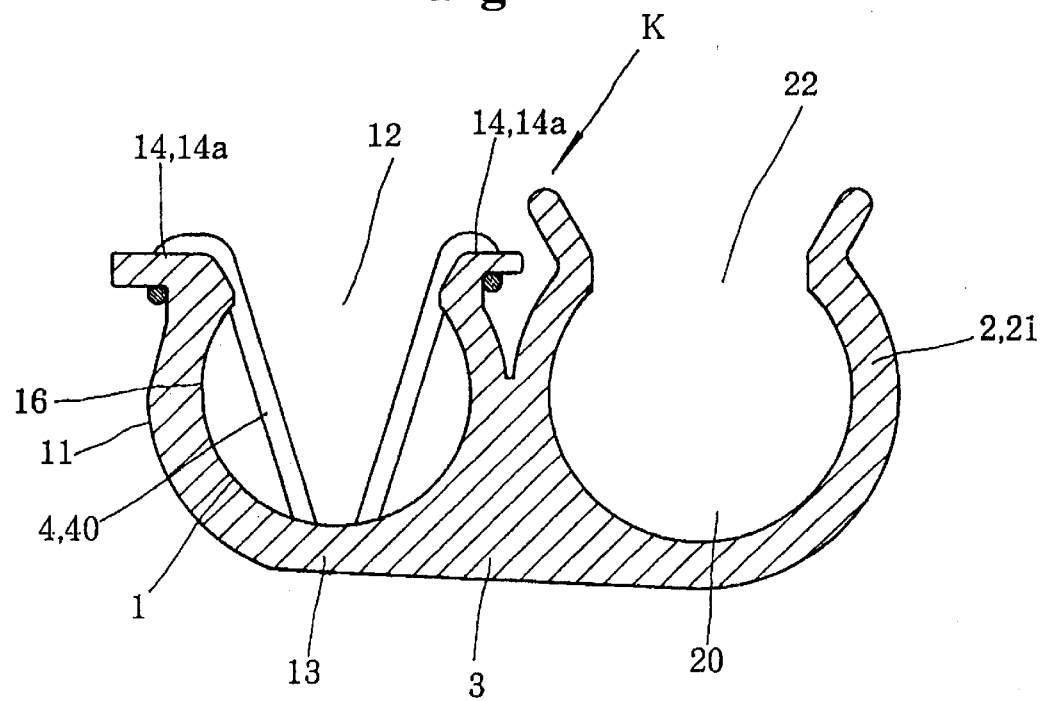
FIG. 5 is a cross sectional view taken along line 5—5 in FIG. 6.
Figure 6:
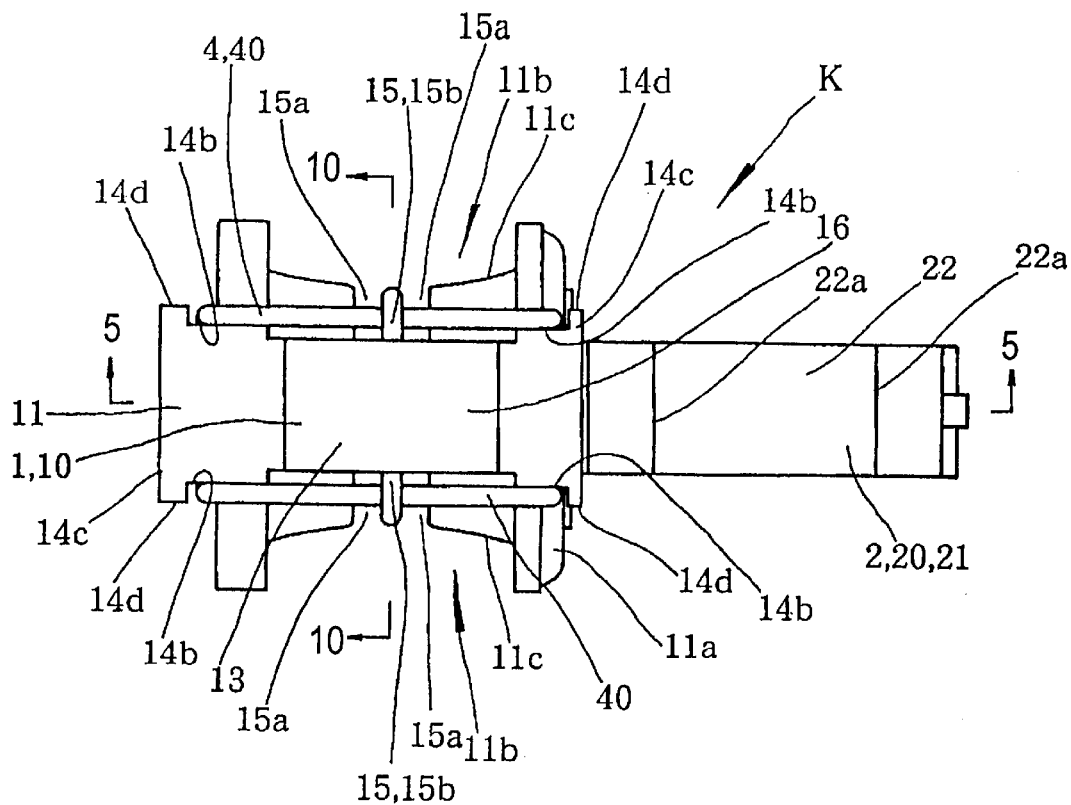
FIG. 6 is a top plan view of the clamp.
Figure 7:
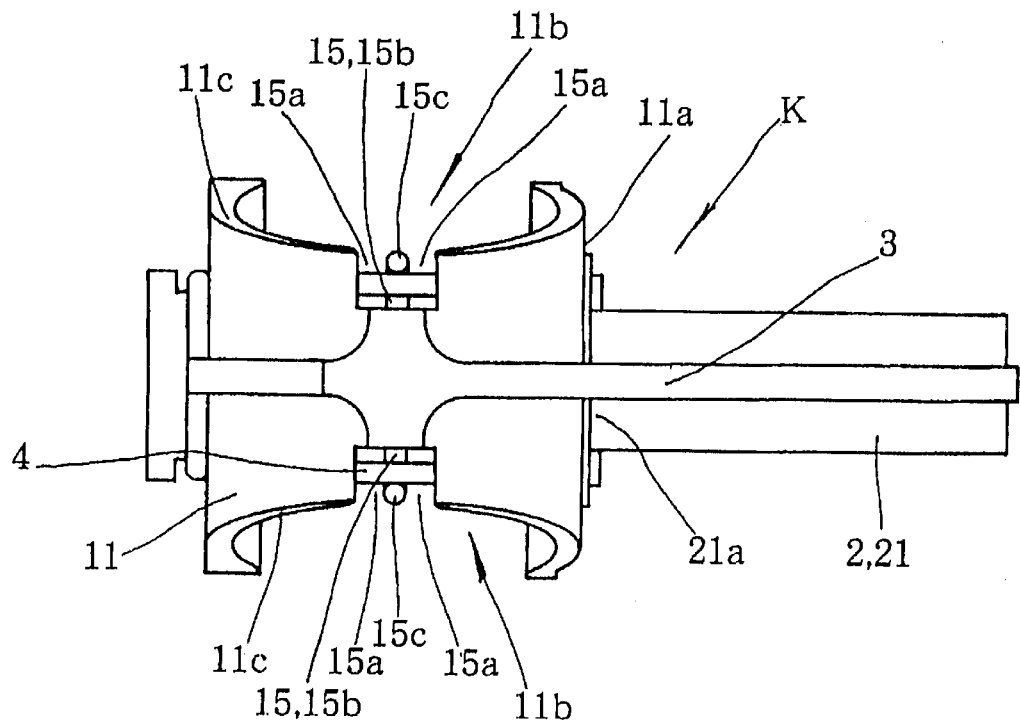
FIG. 7 is a bottom plan view thereof.
Figure 8:
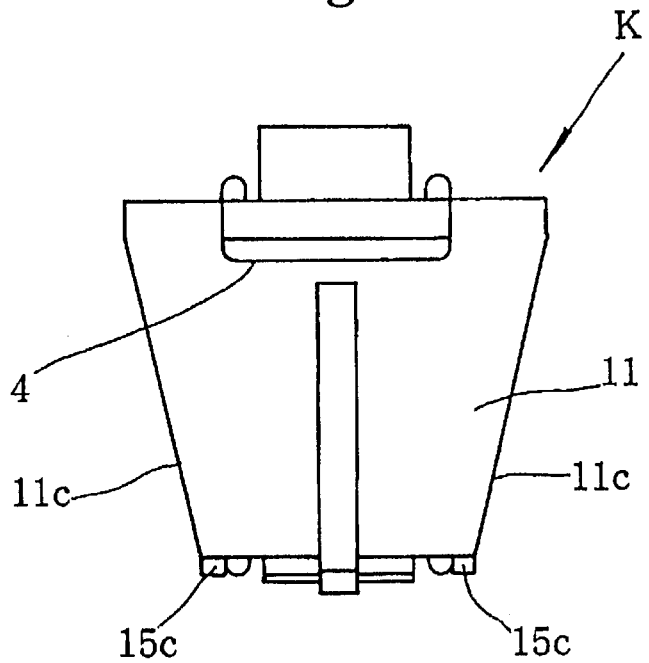
FIG. 8 is a left side view thereof.
Figure 9:
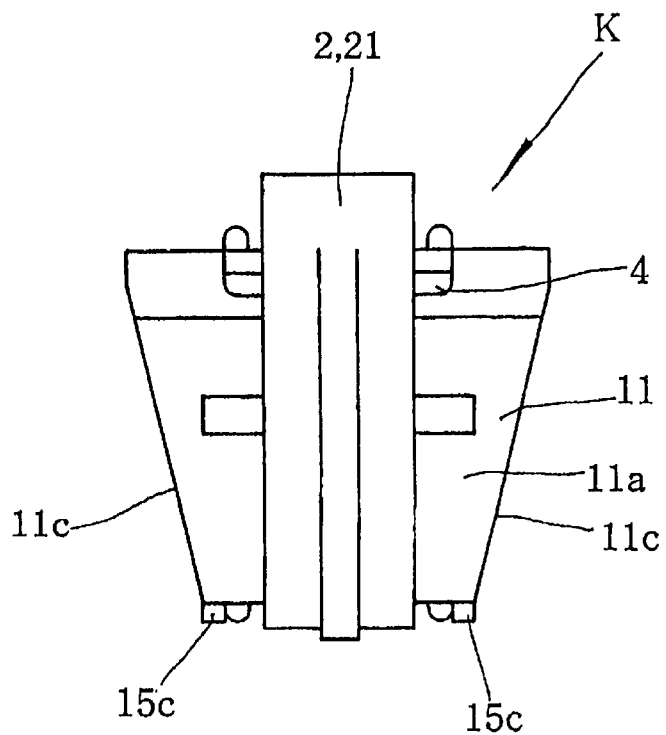
FIG. 9 is a right side view thereof.
Figure 10:
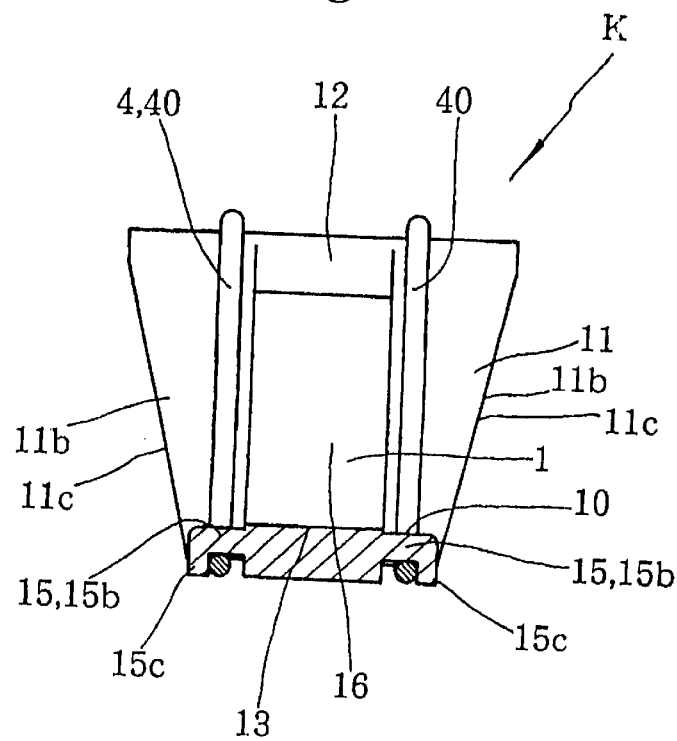
FIG. 10 is a cross sectional view taken along line 10—10 in FIG. 6.

Then, in this embodiment, the rubber-like elastic ring 4 is hooked at the respective surfaces, which face the bottom portion 13 side of the holding recess section 1, of the projecting pieces 14a forming the upper engagement portions 14. In the rubber-like elastic ring 4 hooked between a pair of the upper engagement portions 14, one ring constituting portion 40 located inside the holding recess section 1 is hooked outside the projecting portion 15b forming the lower engagement portion 15 located at a side of one opening portion 11b, and the other ring constituting portion 40 located inside the holding recess section 1 is hooked outside the projecting portion 15b forming the lower engagement portion 15 located at a side of the other opening portion 11b. Accordingly, a pair of the ring constituting portions 40 respectively extends between the upper engagement portions 14 through the lower engagement portions 15 to form V-shapes opened at the side of the fitting entrance 12 as shown in FIG. 4.

Accordingly, a pair of the ring constituting portions 40 situated inside the holding recess section 1 is bent in advance from the side of the fitting entrance 12 toward the side of the bottom portion 13, to thereby decrease the resistance of the ring constituting portions 40, that is, the rubber-like elastic ring 4 at the time of fitting the elongated member P into the holding recess section 1.

Incidentally, in this embodiment, there are provided auxiliary pieces 14c, which are integrally formed with the projecting pieces 14a along the projecting ends of the projecting pieces 14a forming the upper engagement portions 14, and in the auxiliary pieces 14c, end portions 14d directed toward the end surfaces 11c of the opening portions 11b of the annular member 11 project to outer sides beyond the end portions 14b of the projecting pieces 14a. The end portions 14d of the auxiliary pieces 14c prevent the rubber-like elastic ring 4, which are once hooked at the projecting pieces 14a, from disengaging from the projecting pieces 14a.

Also, the projecting ends of the projecting portions 15b forming the lower engaging portions 15 are provided with auxiliary projections 15c projecting downwardly from the projecting ends of the projecting portions 15b, that is, projecting toward a direction away from the bottom portion 13 of the holding recess section 1. The auxiliary projections 15c prevent the rubber-like elastic ring 4, which are once hooked at the projecting portions 15b, from disengaging from the projecting portions 15b.

Also, each upper engagement portion 14 is formed to have a length that allows the end portion 14b, which is directed to the end surface 11c surrounding the opening portion 11b located in the direction orthogonal to the longitudinal direction of the elongated member P in the annular member 11 forming the holding recess section, to be located to the inner side with respect to the end surfaces 11c, and each lower engagement portion 15 is formed of the projecting portion 15b located between two split grooves 15a opened to the outside in the end surface 11c of the opening portion 11b. Therefore, in the condition that the elongated member P is fully fitted into the holding recess section 1, a pair of the ring constituting portions 40 of the rubber-like elastic ring 4, which is located inside the holding recess section 1, is elastically deformed by the elongated member P along the recess section inner surface 10 of the holding recess section 1, so that one side of each ring constituting portion 40 closely contacts the recess section inner surface 10, and the other side of each ring constituting portion 40 closely contacts the peripheral surface of the elongated member P.

As the positions, where the lower engagement portions 15 are formed, are located closer to the side of the bottom portion 13 of the holding recess section 1, the ring constituting portions 40 of the rubber-like elastic ring 4, which are located inside the holding recess section 1, can be more largely bent in advance toward the bottom portion 13 side. Also, as the positions, where the lower engagement portions 15 are formed, are located closer to the side of the bottom portion 13 of the holding recess section 1, the resistance of the ring constituent portions 40 in case of fitting the elongated member P into the holding recess section 1 can be further reduced.

However, it is sufficient that the lower engagement portions 15 are formed at positions closer to the bottom portion 13 of the holding recess section 1 than the upper engagement sections 14, and also, the lower engagement portions 15 may be provided at plural points.

Alternatively, as shown in FIG. 11 and FIG. 12, the lower engagement portion 15 at one side of the opening portions 11b of the holding recess section 1 can be located at one side with respect to the center line x, and the lower engagement portion 15 at the other side of the opening portions 11b can be located at the other side with respect to the center line x, so that the rubber-like elastic ring 4 can extend between a pair of the upper engagement portions 14 through the lower engagement portions 15 arranged as described above.

Also, in the embodiment of the invention, inside the holding recess section 1, there is formed a raised portion 16 to be located between the ring constituting portions 40 of the rubber-like elastic ring 4, which are elastically deformed along the recess section inner surface 10 of the holding recess section 1 by the elongated member P inserted from the fitting entrance 12 of the holding recess section 1 so that the ring constituting portions 40 closely contacts the peripheral surface of the elongated member P.

More specifically, the raised portion 16 is formed along the recess section inner surface 10 of the holding recess section 1 to extend in a range from one of the rim portions 12a of the fitting entrance 12 to the other rim portion 12a.

As a result, in the embodiment of the invention, even if a force of moving the elongated member P in the longitudinal direction of the elongated member P is applied to the elongated member P fitted and held in the holding recess section 1, one of the ring constituting portions 40 of the rubber-like elastic ring 4 is allowed to abut against the raised portion 16 by the applied force, to thereby resist against the force. Therefore, the movement of the elongated member P due to the application of the force described above can be prevented significantly.

Incidentally, in this embodiment, a protruding size of the raised portion 16 is set such that the side, which faces the elongated member P, of the rubber-like elastic ring 4 elastically deformed along the recess section inner surface 10 of the holding recess section 1 by fitting the elongated member P is located at the inner side with respect to the upper surface of the raised portion 16, and in the condition that only the rubber-like elastic ring 4 mostly contacts the peripheral surface of the elongated member P, the elongated member P can be held (refer to FIG. 3).

According to the clamp of the invention, the rubber-like elastic ring extends between the upper engagement portions, which are respectively formed at both sides with the fitting entrance interposed therebetween, of the holding recess section through the lower engagement portions, which are formed at the positions closer to the bottom portion of the holding recess section than the upper engagement portions, such that a pair of the ring constituting portions of the rubber-like elastic ring located inside the holding recess section is respectively bent in advance toward the bottom portion side of the holding recess section. Therefore, as compared with the case in which the rubber-like elastic ring is extended straight between the rim portions of the fitting entrance of the holding recess section, the resistance of the rubber-like elastic ring in the clamp of the invention accompanied by fitting the elongated member into the holding recess section through the fitting entrance is small, and the operation of fitting the elongated member into the holding recess section can be smoothly carried out.

While the invention has been explained with reference to the specific embodiments of the invention, the explanation is illustrative and the invention is limited only by the appended claims.

What is claimed is:

1. A clamp for attaching an elongated member to an object, comprising:

a holding section having a fitting entrance, a recess communicating with the fitting entrance for receiving the elongated member from a side thereof through the fitting entrance to elastically hold the elongated member therein, a raised portion formed at an inner surface thereof, side portions disposed to sandwich the raised portion therebetween along the holding section, each side portion having a notch, and a bottom portion, a mounting section connected to the holding section for attaching the clamp to the object, upper engagement portions formed at upper sides of the holding section to sandwich the fitting entrance therebetween, lower engagement portions formed at the holding section closer to the bottom portion than the upper engagement portions, each lower engagement portion being located in the notch in each side portion, and an elastic ring having a pair of ring constituting portions and disposed between the upper engagement portions through the lower engagement portions such that the ring constituting portions situated inside the recess are located outside the raised portion and bent in advance to the bottom portion of the holding section, said elastic ring being elastically deformed along the elongated member inserted from the fitting entrance to allow the ring constituting portions to closely contact the elongated member.

2. A clamp according to claim 1, wherein said lower engagement portions are formed at the bottom portion of the holding section.

3. A clamp according to claim 1, wherein said lower engagement portion includes a projection extending in a direction away from the fitting entrance.

4. A clamp according to claim 1, wherein said upper engagement portion has a lateral size essentially same as the width of the raised portion, and projections at an outer end thereof extending laterally outwardly therefrom.

5. A clamp according to claim 1, wherein said lower engagement portions are formed to be deviated to one side of the holding section, respectively.

* * * * *